(12) United States Patent
Murphy (10) Patent No.: US 7,149,057 B2
(45) Date of Patent: Dec. 12, 2006

(54) OPEN-CHANNEL TORSION BEND SECTION

(75) Inventor: James Morgan Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/903,024

(22) Filed: Jul. 11, 2001

(65) Prior Publication Data

US 2002/0044385 A1 Apr. 18, 2002

Related U.S. Application Data

(60) Provisional application No. 60/217,348, filed on Jul. 11, 2000.

(51) Int. Cl.
*G11B 5/48* (2006.01)

(52) U.S. Cl. .................................................. 360/244.8

(58) Field of Classification Search ............. 360/244.2, 360/244.3, 244.8, 244.9
See application file for complete search history.

(56) References Cited

U.S. PATENT DOCUMENTS

| | | | | |
|---|---|---|---|---|
| 4,884,154 A | * | 11/1989 | Onodera et al. ......... | 360/244.9 |
| 5,126,904 A | * | 6/1992 | Sakurai ................... | 360/244.2 |
| 5,313,353 A | * | 5/1994 | Kohso et al. ............ | 360/244.2 |
| 5,452,158 A | | 9/1995 | Harrison et al. | |
| 5,734,525 A | | 3/1998 | Girard | |
| 5,844,752 A | | 12/1998 | Bozorgi et al. | |
| 5,850,319 A | | 12/1998 | Tangren | |
| 5,870,252 A | * | 2/1999 | Hanrahan ................ | 360/244.8 |
| 5,894,381 A | * | 4/1999 | Allen et al. ............. | 360/244.9 |
| 5,936,803 A | * | 8/1999 | Berding .................. | 360/244.8 |
| 6,043,956 A | * | 3/2000 | Hanya et al. ............ | 360/244.9 |
| 6,141,187 A | * | 10/2000 | Wong et al. ............. | 360/244.8 |
| 6,212,044 B1 | * | 4/2001 | Murakami et al. ....... | 360/244.9 |
| 6,307,715 B1 | * | 10/2001 | Berding et al. .......... | 360/244.8 |
| 6,307,719 B1 | * | 10/2001 | Mallary ................... | 360/244.8 |
| 6,532,135 B1 | * | 3/2003 | Chen et al. .............. | 360/244.8 |

* cited by examiner

*Primary Examiner*—Angel Castro
*Assistant Examiner*—Christopher R. Magee (57) ABSTRACT

According to the present invention there is provided a head positioning suspension for a modern disc drive. The suspension has a base, a load beam, and a bend section. The load beam extends in a first plane and has a longitudinal axis extending between its first and second ends. The load beam also has a transverse axis extending perpendicular to the longitudinal axis that is also within the first plane. The bend section connects the base to one end of the load beam and includes a longitudinal axis and transverse axis parallel to each of the respective longitudinal and transverse axis of the load beam. The bend section includes a plate with a given width extending substantially within the first plane and a rail that extends across a portion of that width in a direction that is parallel to the transverse axis of the bend section. The bend section rail further extends in a direction out of the first plane.

24 Claims, 11 Drawing Sheets

OPEN-CHANNEL TORSION BEND SECTION

This application claims the benefit of and is a continuation-in-part of the provisional application Ser. No. 60/217,348, entitled "Open-Channel Torsion Bend Section," filed Jul. 11, 2000.

FIELD OF THE INVENTION

This invention relates generally to head positioning suspensions in modern disc drives. More particularly this invention relates to a suspension's bend section which must be compliant in rotation about a certain axis while maintaining relative stiffness in all other directions.

BACKGROUND OF THE INVENTION

Head positioning suspensions in modern disc drives are designed to be relatively compliant in the normal direction to the disc surface while remaining relatively stiff in all other directions. Compliance in the normal direction (the Z-axis; direction perpendicular to or away from the disc surface) allows the slider to lift off the disc surface and "fly" above the disc while the disc is rotating. Suspension stiffness in all other directions prevents yaw rotation of the head as well as lateral (Y-axis) and linear (X-axis) translation motion while pitch and roll in the head is allowed by the head gimbal assembly.

The head positioning suspension includes a bend section that connects the suspension's base region to the suspension's load beam. The bend section incurs the predominance of the necessary compliance in the form of rotational motion about a transverse or Y-axis that is perpendicular to the suspension's longitudinal or X-axis (the direction of the suspension's extension from the base plate to the slider) and perpendicular to the suspension's out-of-plane or Z-axis. Although rotational compliance about the Y-axis at the bend section is desired, translational motion at the bend section in the Z-axis direction is not advantageous for lowering resonance frequency.

Conventional bend sections are comprised of one or more flat strips of metal spanning the base region to the load beam. Such bend sections have a trade-off between minimizing the Y-axis rotational stiffness and maximizing the Z-axis translational stiffness. Simple beam stiffness relations govern this trade-off. Thus, for a given low Y-rotational stiffness necessary to keep the spring rate low, thus allowing free motion of the slider over the disc surface, there is a limit to how high the Z-axis translation stiffness can be. This trade-off limits other important considerations such as achievable resonant frequencies. In fact, in the case of modem ultra-stiff load beam suspensions, the out-of-plane compliance at the bend section can dominate the resonant response.

Therefore, there is a need for a bend section design that will circumvent the trade-off between low rotational compliance and high translational stiffness inherent in conventional bend section designs.

SUMMARY OF THE INVENTION

According to the present invention there is provided a head positioning suspension for a modern disc drive. The suspension has a base, a load beam, and a bend section. The load beam extends in a first plane and has a longitudinal axis extending between its first and second ends. The load beam also has a transverse axis extending perpendicular to the longitudinal axis that is also within the first plane. The bend section connects the base to one end of the load beam and includes a longitudinal axis and transverse axis parallel to each of the respective longitudinal and transverse axis of the load beam. The bend section includes a plate with a given width extending substantially within the first plane and a rail that extends across a portion of that width in a direction that is parallel to the transverse axis of the bend section. The bend section rail further extends in a direction out of the first plane.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PRESENTLY PREFERRED EMBODIMENTS

The following is a detailed description of the preferred embodiments presently contemplated for carrying out the present invention. The present invention is believed to be applicable to bend sections in a suspension system with particular bending and torsion characteristics. In particular, the present invention is directed to bend sections in disc drive head positioning suspensions that are compliant in torsion and stiff in out-of-plane bending. While the present invention may not be so limited by the following detailed description, an appreciation of various aspects of the invention will be gained through a discussion of the examples provided below.

Figure 1:
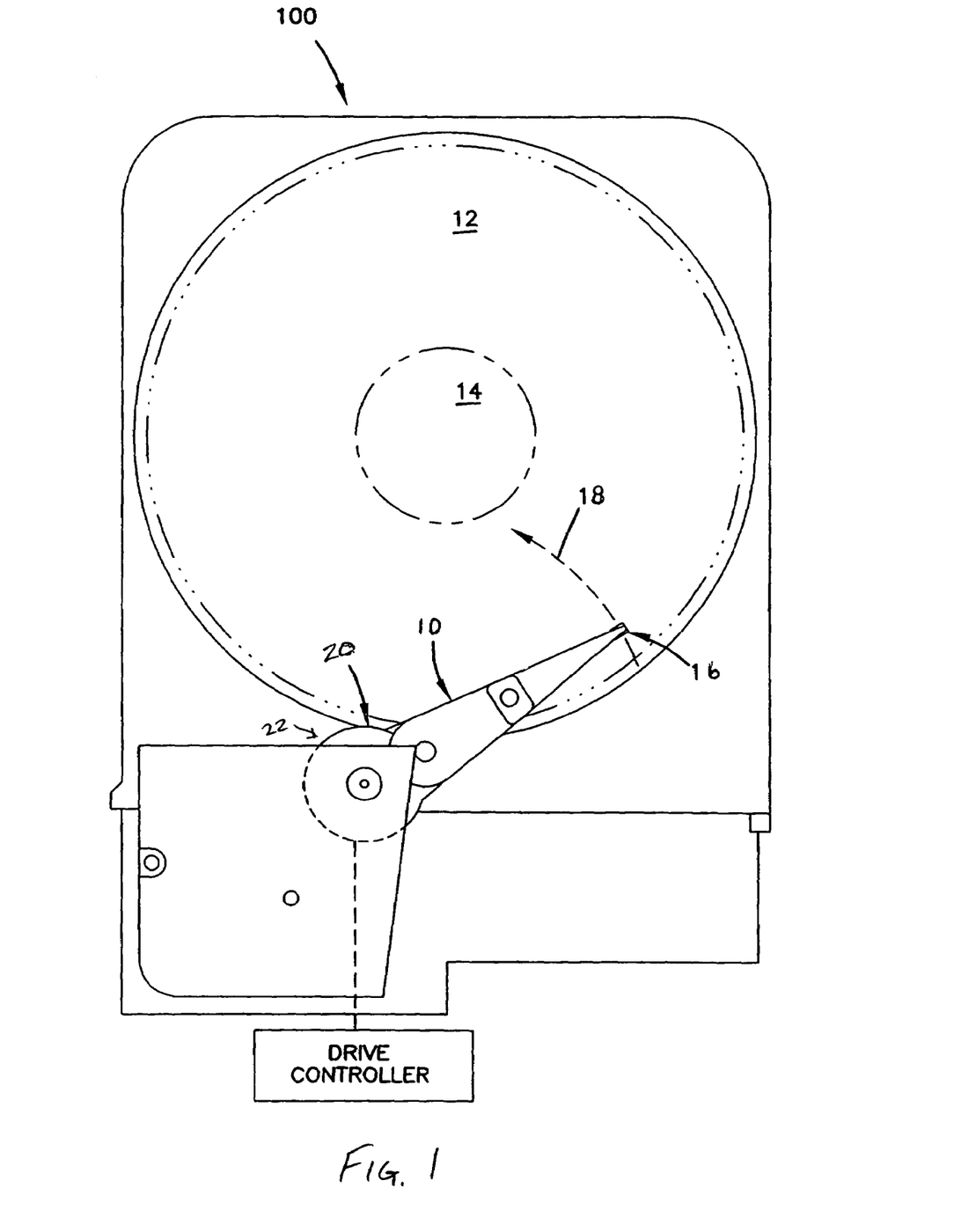
FIG. 1 is a top view of a disc drive system embodying the present invention.

FIG. 1 shows a disc drive system 100 embodying the present invention. As shown in FIG. 1, at least one rotatable magnetic disc 12 is supported on a spindle 14 and rotated by a disc drive motor (not shown). The magnetic recording media on each disc is in the form of an annular pattern of concentric data tracks (not shown) on disc 12.

At least one slider 16 is positioned on the disc 12. As the disc rotates, slider 16 is moved radially in and out as shown by arrow 18 over the disc surface so that the heads located on the slider 16 may access different portions of the disc where desired data is recorded or read from. Each slider 16 is attached to an actuator arm 20 by a suspension 10. The suspension 10 provides a slight spring force which biases the slider 16 against the disc surface. Each actuator arm 20 is attached to an actuator 22.

During operation of the disc storage system, the rotation of disc 12 generates an air bearing between an air bearing surface (ABS) on the slider 16 and the disc 12. The ABS is the surface of slider 16 that includes a reading head and faces the surface of the disc 12. The air bearing exerts an upward force or lift on the slider 16. The air bearing thus counter-balances the slight spring force of suspension 10 and supports the slider 16 slightly above the disc 12 surface by a small, substantially constant spacing during normal operation. Due to irregularities of the disc surface, suspension 10 must be relatively compliant to allow the slider to move up and down, in a direction normal to the disc surface, in order to allow slider 16 to adjust to variations in the disc surface.

The above description of a typical magnetic disc storage system, and the accompanying illustration of FIG. 1, are for representation purposes only. It should be apparent that disc storage systems may contain more and different components than those illustrated in FIG. 1. The present invention is best described as related to disc storage systems as illustrated in FIG. 1. However, the invention is not so limited to disc storage applications and may be applied to a variety of other applications wherein bend section technology may be useful.

Figure 2:
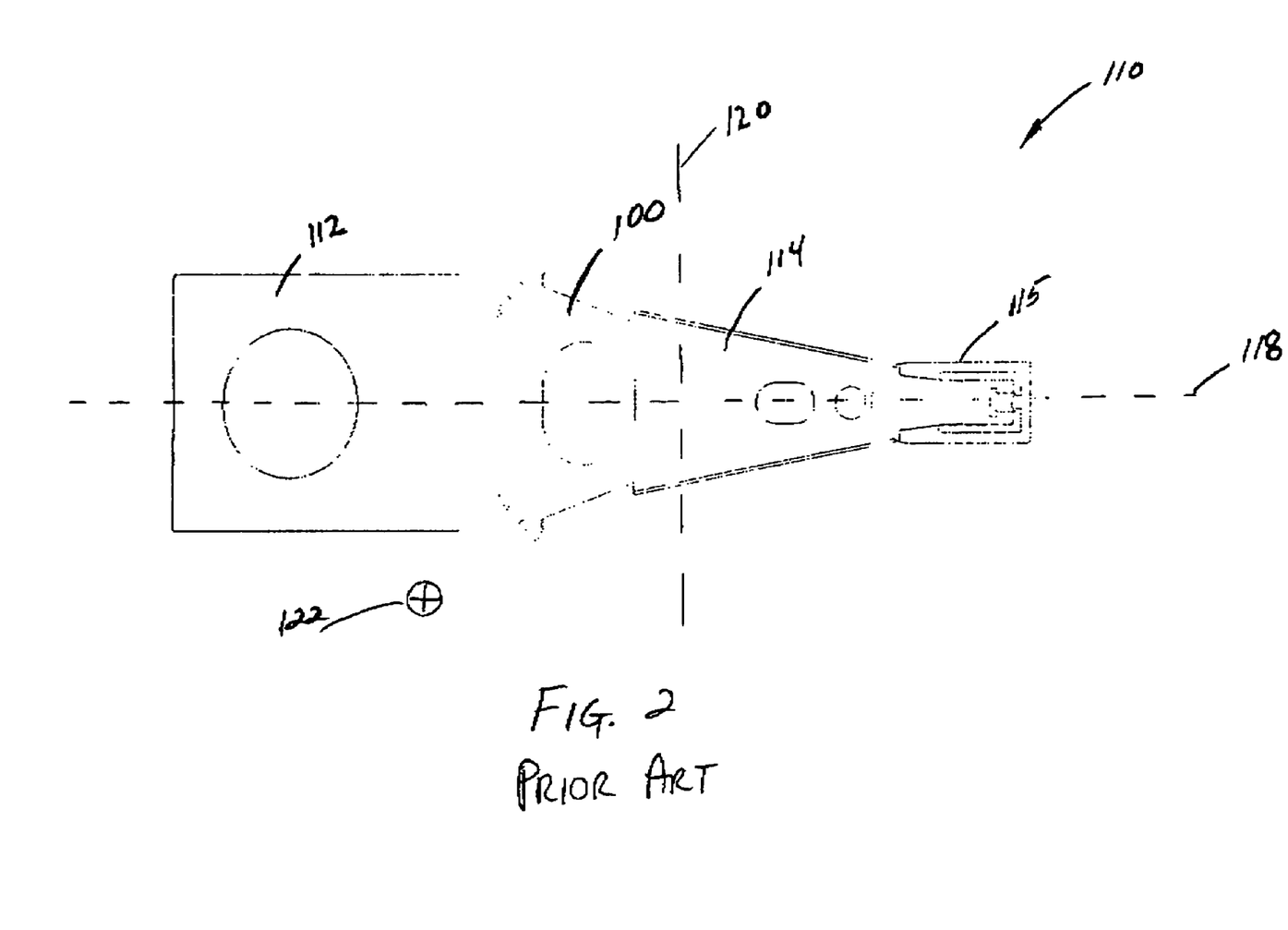
FIG. 2 is a top view of one embodiment of a disc drive head suspension system common in the art.

One example of a suspension 110 common in the prior art is shown in FIG. 2 and includes a base 112, a load beam 114, a gimbal 115 and a bend section 100. Typically, suspension 110 has a longitudinal, or load beam axis 118 that extends from the base 112 through gimbal 115, and a transverse or Y-axis 120 which extends perpendicular to the load beam axis 118 within the same plane. Suspension 110 further has an out-of-plane or Z-axis 122 (marked with a circled cross) which extends into and out of the page. "In plane", according to FIG. 2, would include axes 118 and 120 and would further typically extend parallel to a disc surface, such as disc 12 illustrated in FIG. 1.

Figure 3:
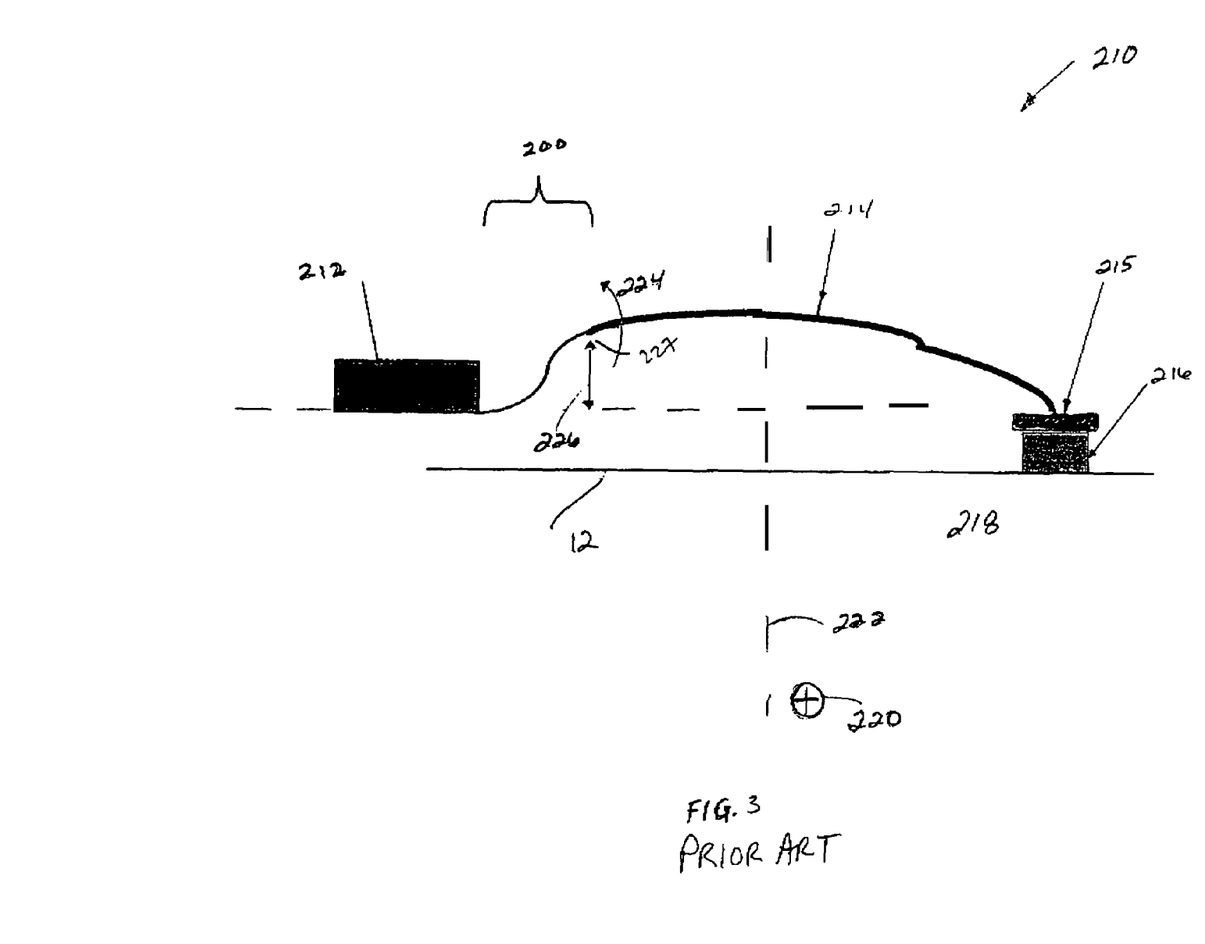
FIG. 3 is an exaggerated side view of a disc drive head suspension system in a first bending mode of resonance.

Typically, bend section 100 connects base 112 and load beam 114. Bend section 100 typically has a design and properties different from base 112 and load beam 114 that provide specific results under bending and torsion forces. A further purpose of bend section 100 is to provide a predetermined load to a slider attached to gimbal 115. The bend section 100 typically includes a particular configuration, such as a radius or bend, to provide this load. The function of bend section 100 and its relationship to other components of the suspension 110 are further illustrated in FIG. 3. FIG. 3 is an exaggerated side view of a disc drive head suspension system in a first bending mode of resonance. Normally, the bend section 200 is substantially planar. However, as shown in FIG.3, when the suspension is resonating, point 227 of the bend section 200 travels up and down as indicated by arrow 226. It is desirable to design a bend section that substantially reduces or eliminates the up and down movement of point 227 as shown by arrow 226 while allowing rotation about that point 227.

The suspension 210 includes a base 212, load beam 214, gimbal 215 and a bend section 200. The gimbal 215 has a read head 216 mounted thereto that floats above a disc's surface 12. Suspension 210 further includes a longitudinal or load beam axis 218, a transverse axis 220 extending into and out of the page (shown as a cross circle 220) and an out-of-plane or Z-axis 222. Given the relative positioning of the suspension, slider and disc surface, it is advantageous for the suspension 210 to allow Y-axis 220 rotation motion at the bend section, as illustrated by arrow 224. This type of wide rotation allows Z-translation at the end of load beam 214 to which slider 216 is attached.

Conventional bend sections, such as bend section 200 illustrated in FIG. 3, typically consist of one or more flat strips of metal spanning between the suspension base and load beam. With such conventional bend sections, there is a trade off between maximizing the Y-rotation compliance while minimizing the Z-axis translational compliance of the bend section. This trade off is governed by simple beam stiffness relations that require a limit to how high the Y-rotation compliance can be extended for a given low Z-translation compliance. Thus, desired results such as a high resonant frequencies and minimal out-of-plane compliance are restricted for such suspensions.

Figure 4:
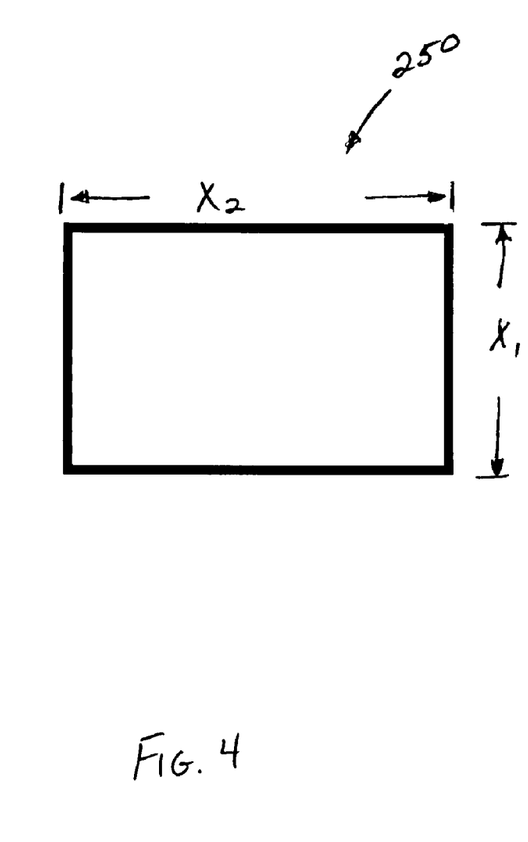
FIG. 4 is a cross-sectional view of a closed channel bend section.
Figure 5:
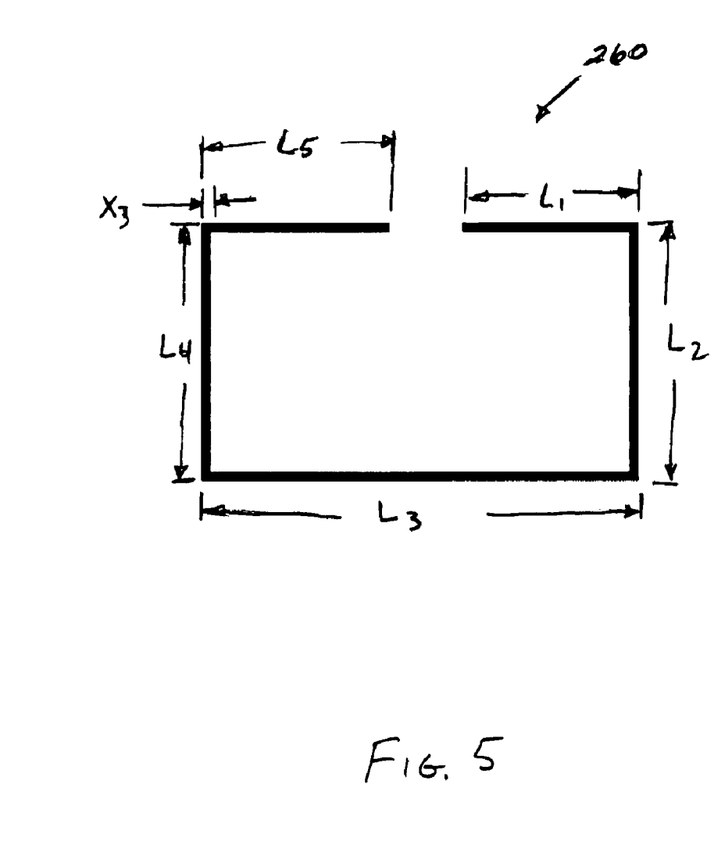
FIG. 5 is a cross-sectional view of an open channel bend section.

The present invention is able to circumvent this trade off by utilizing the properties of open channels, which can be very stiff in bending while relatively compliant in torsion. Compliance in torsion of an open channel provides low spring rates and maximum resonant frequencies, while stiffness in bending of the open channel is advantageous for preventing motion in out-of-plane directions Cross-sectional views of a closed channel beam 250 and an open channel beam 260 are illustrated in FIGS. 4 and 5 respectively. While these two beams are relatively comparable in stiffness under transverse bending, the closed channel beam is an order of magnitude stiffer in torsion than the open channel beam.

In essence, the stiffness of beam 250 in torsion is directly related to the cross-sectional area of the entire cross-section of the beam ($X_1$ multiplied by $X_2$) whereas the stiffness in torsion of beam 260 is directly related to the cross sectional area of walls of the channel. As related to beam 260, this would equal the width of the material ($X_3$) multiplied by the total length of material around the channel ($L_1+L_2+L_3+L_4+L_5$). Given the disparity in cross-sectional area used for each beam, the stiffness in torsion of beams 250 and 260 are significantly different. Furthermore, when comparing the stiffness of beams 250 and 260 to the stiffness of a flat plate, both beams 250 and 260 are significantly stiffer in bending while beam 260 has comparable stiffness in torsion compared to a flat plate.

One example of a bend section 300 of the present invention including an open channel, with the advantages described above, is shown in FIG. 6. Bend section 300 includes a base 330, base attachments 334, load beam attachment 332, and rails 350. Arrows 318, 320 and 322 illustrates the X, Y and Z-axis directions respectively.

Figure 6:
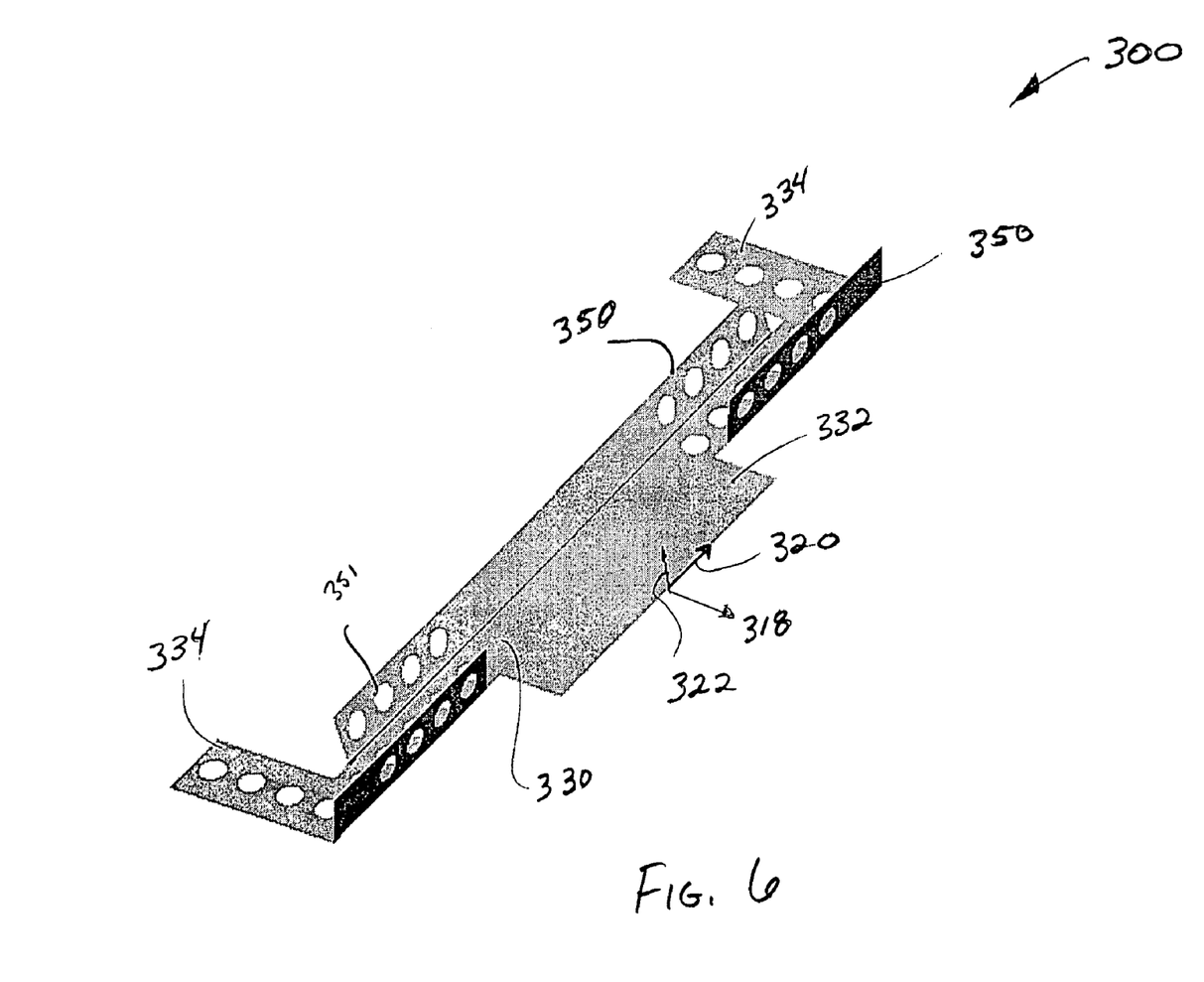
FIG. 6 is a perspective view of one preferred embodiment of a bend section according to the present invention.

The components of bend section 300 can be formed from one continuous piece or, in the alternative, may be composed of independent elements coupled or fastened together. As illustrated in FIG. 6, plate 330 is flat, continuous, and substantially planar within the X-axis 318 and Y-axis 320 plane (XY plane). Load beam attachment 332 extends from plate 330 within the same plane, and is prepared for attachment to a load beam. Load beam attachment 332 is preferably of the same material having the same characteristics as plate 330, however, it may be made of a different material having different properties. Load beam attachment 332 may be fastened to the load beam in a variety of ways including, for example, welding, fasteners, or adhesives. Alternatively, and more preferably, the bend section 300 is formed as an integral part of the load beam and base plate, i.e., all formed from the same sheet of metal. The gimbal such as 115 as shown in FIG. 2 is welded onto the load beam. Further extending from plate 330 are base attachments 334. Base attachments 334 are typically made of the same material as plate 330 and extend in the same plane as plate 330. Base attachments 334 may be attached to a suspension base, such as base 212 illustrated in FIG. 3, using, for example, fasteners, welding, or adhesives.

Figure 7:
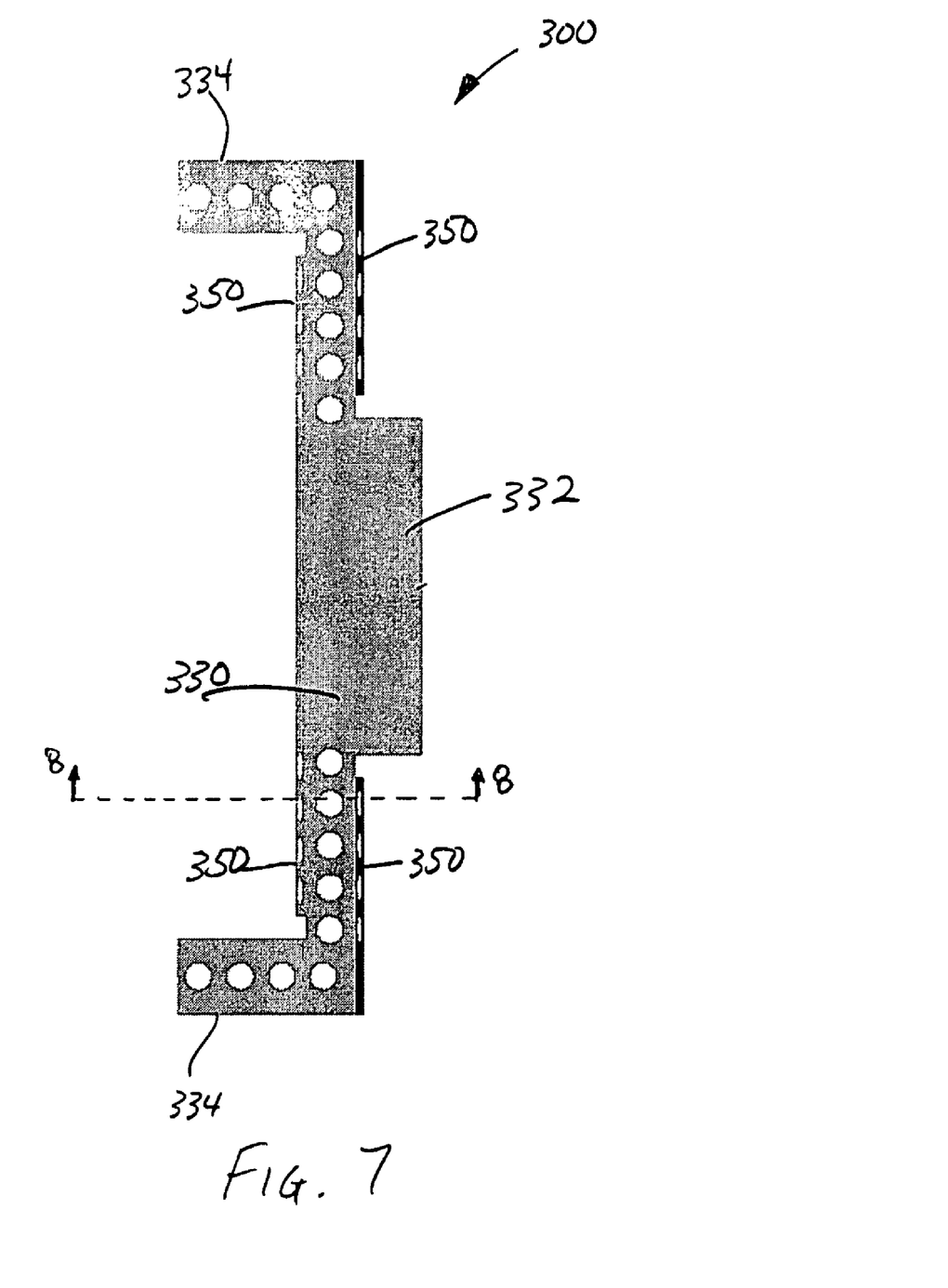
FIG. 7 is a top view of the bend section shown in FIG. 6.
Figure 8:
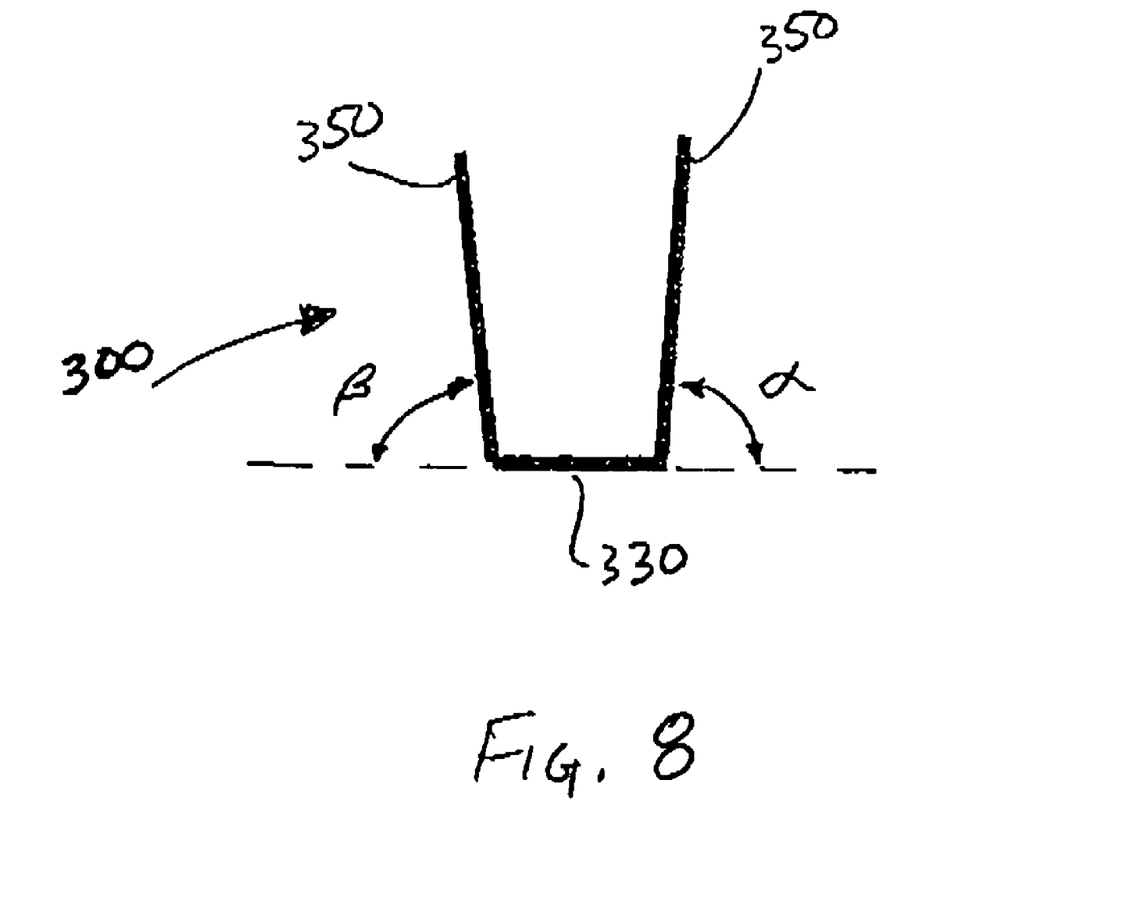
FIG. 8 is a cross-sectional view of the bend section shown in FIG. 6.

FIG. 7 is a top view of the bend section shown in FIG. 6 and FIG. 8 is a cross-sectional view of the bend section shown in FIG. 7 taken along line 8—8. Rails 350 extend from plate 330 out of the XY plane while FIGS. 6–8 illustrate the bend section 300 including two rails 350, one rail may be used to obtain the desired result. This particular embodiment, illustrated as bend section 300, was modeled using analytical equations and finite element modeling. Bend section 300 was compared against a purely conventional flat strip inward-tapering bend section (as is common in the art) having the same Y rotation stiffness as bend section 300, and found to have three times the amount of out-of-plane stiffness. The holes 351 illustrated in FIG. 6 are optional, and in a preferred embodiment were placed on each surface of bend section 300 to reduce the stiffness of the structure.

In one preferred embodiment, the angle at which rails 350 extend from plate 330 is substantially perpendicular. Alternatively, the angle at which the rails 350 extend from plate 330 may vary greatly so long as the rails do not extend in the same plane as plate 330. As shown in FIG. 8 the angles at which the rails 350 extend with respect to plate 330 are shown as angles $\alpha$ and $\beta$. In one preferred embodiment angles $\alpha$ and $\beta$ may be the same or they may be different. While the rails 350 in FIG. 8 are shown bent up with respect to plate 330, they may alternatively be bent below plate 330. In addition, the rails 350 may have an additional bend as shown in FIG. 5 where they extend towards one another but do not touch. Alternatively, they can be bent to extend away from one another. The amount of torsional and bending stiffness can be controlled in part with the use of various angles $\alpha$ and $\beta$. The torsional and bending properties of bend section 300 may also be controlled with the materials used for the bend section (the rails in particular), and the specific design of bend section 300 including, for example, the length, width, thickness and location of each of the rails.

The rails 350 of bend section 300 may be formed out of the same material as plate 330 or may be made of a different material and later attached or coupled to plate 330 using any of a variety of attachment methods such as welding, adhesives, or fasteners.

Bend section 300, as illustrated in FIGS. 6–8, includes an open channel aligned laterally (parallel to the Y-axis of the suspension) on plate 330 and loaded in torsion by the load beam. The advantageous properties of the channel are best illustrated when a load is applied to load beam 314. Under this type of load, the open channel allows Y-rotation in the bend section while maintaining limited Z-rotation, X-rotation, Z-translation, X-translation, and Y-translation at the bend section.

FIGS. 9–14 illustrate further embodiments of a bend section according to preferred embodiments of the present invention. These embodiments show different lateral widths, shapes, and width of the rails in relation to the width of a load beam and suspension base.

Figure 9:
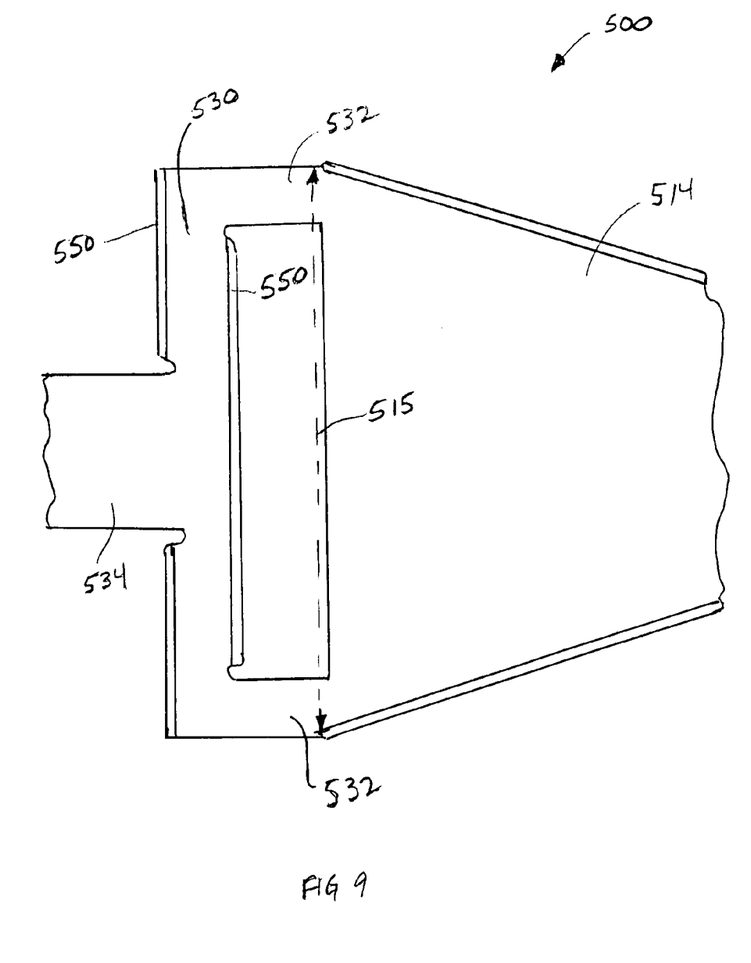
FIG. 9 is a top view of another preferred embodiment of a bend section having a rail width less than the width of a load beam attached to the bend section, according to the present invention.

One example of a bend section 500, as illustrated in FIG. 9, includes a plate 530, load beam attachment 532 for attaching to the load beam 514, base attachment 534 for attachment to a suspension base, and rails 550. In this embodiment, the lateral width of rails 550 is less than or equal to the lateral width 515 of load beam 514.

Figure 10:
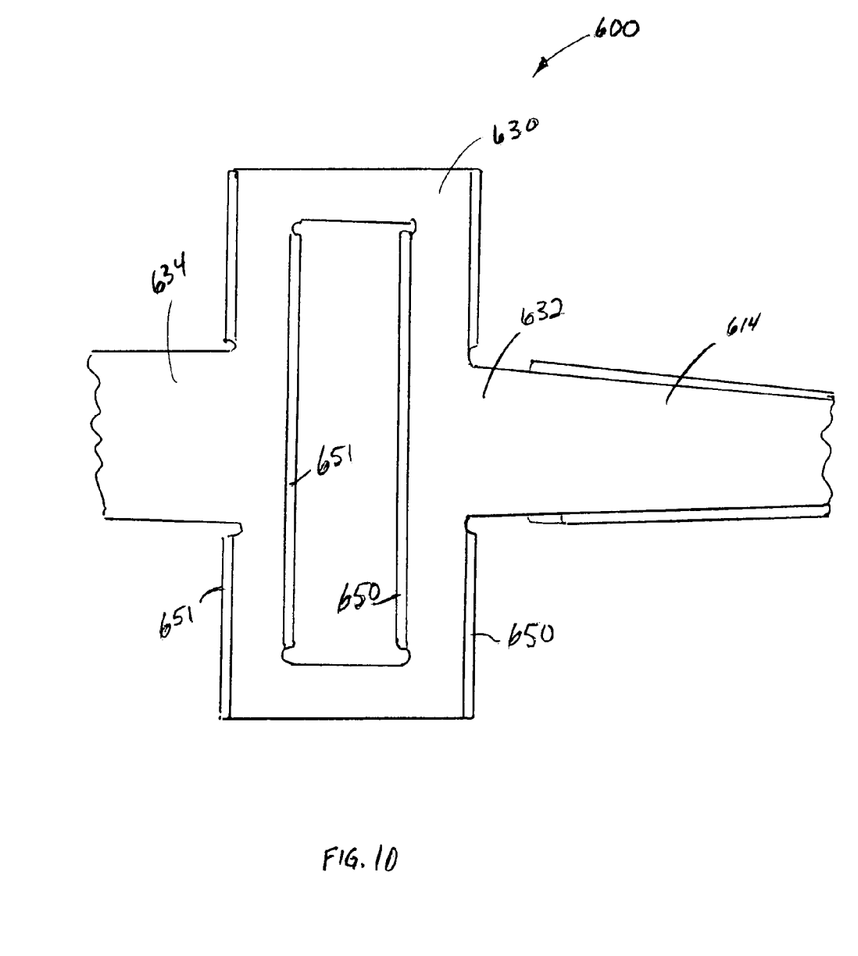
FIG. 10 is a top view of another preferred embodiment of a bend section having two open channels, according to the present invention.

Another example of a bend section 600 of the present invention, as illustrated in FIG. 10, includes a plate 630, load beam attachment 632 for attaching to a load beam 614, and base attachment 634 for attachment to a suspension base, and two sets of rails 650 and 651. According to this embodiment, rails 650 and 651 effectively create two open channels for bend section 600.

Figure 11:
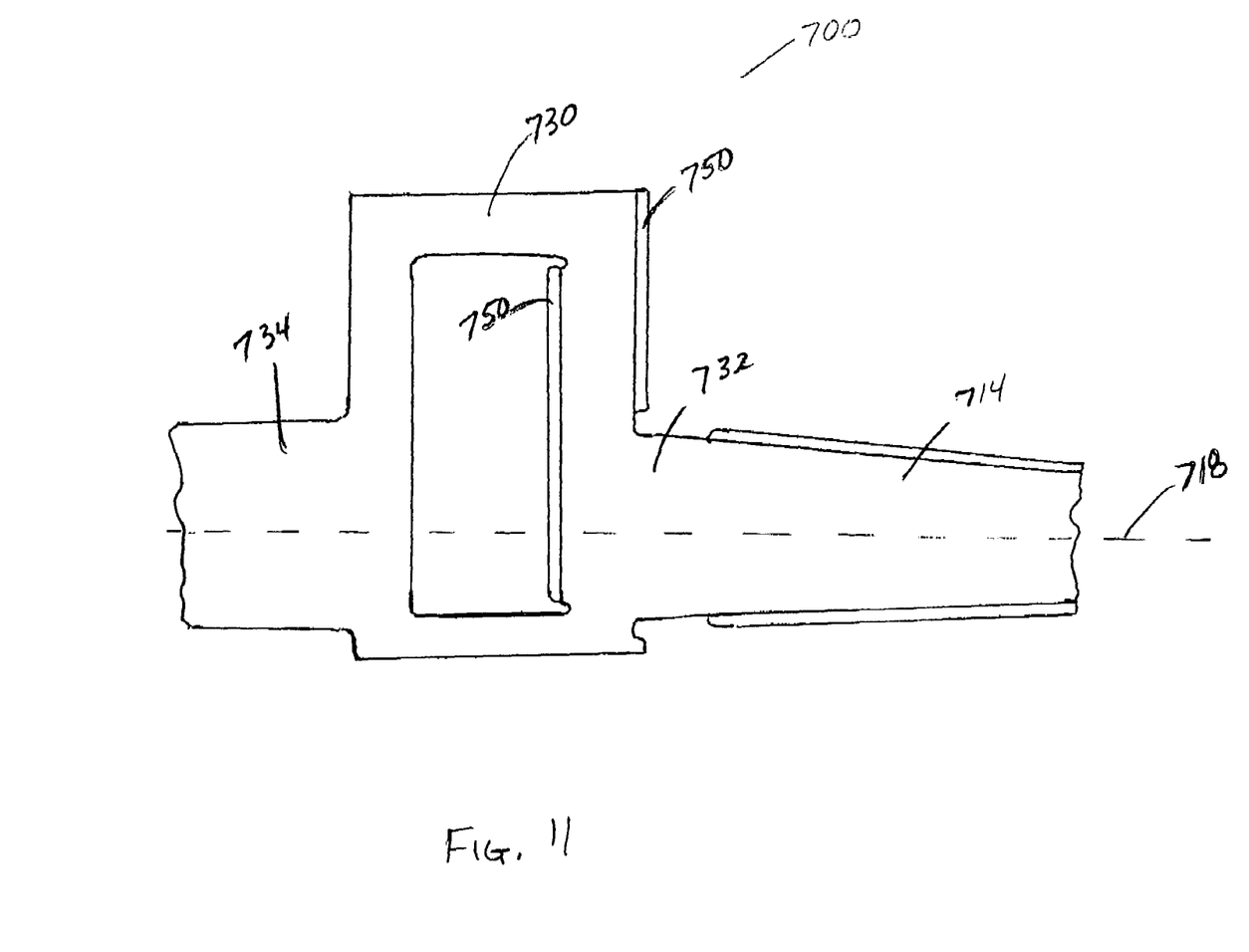
FIG. 11 is top view of another preferred embodiment of a bend section having an open channel and an asymmetrical design, according to the present invention.

Another preferred embodiment of a bend section 700 of the present invention is illustrated in FIG. 11. Bend section 700 includes an asymmetrical design having a plate 730, load beam attachment 732 for attaching to a load beam 714, base attachment 734 for attachment to a suspension base, and rails 750. As illustrated in FIG. 11, bend section 700 is not symmetrical about a longitudinal axis 718 extending from a suspension base plate to the suspension load beam 714. Although such an embodiment would be detrimental for applications in disc drive suspensions, an asymmetrical design such as bend section 700 could be advantageous for many other applications.

Figures 12, 13, 14:
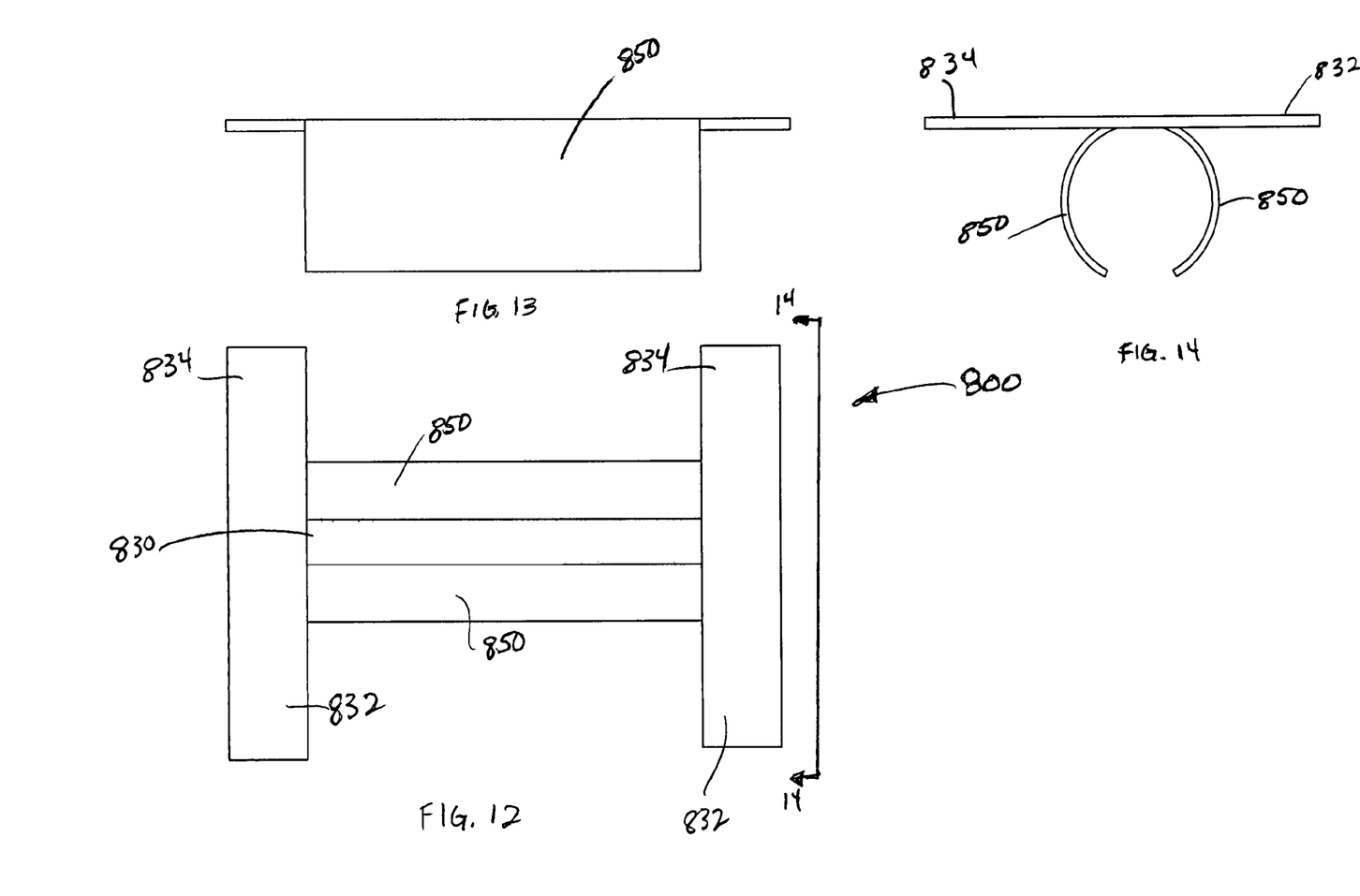
FIG. 12 is a top view of a bend section having a curvilinear rail, according to a preferred embodiment of the present invention.
FIG. 13 is a side view of the bend section shown in FIG. 12.
FIG. 14 is a cross-sectional view of the bend section shown in FIG. 12.

A final example of a bend section 800 of the present invention is illustrated in FIGS. 12–14. FIG. 12 is a top view of the bend section 800, FIG. 13 is a side view of the bend section 800 and FIG. 14 side view of the bend section along lines 14—14. Bend section 800 includes a base 830, load beam attachment 832 for attachment to a load beam, base attachment 834 for attachment to a suspension base, and curvilinear rails 850. Rails 850 illustrated in FIG. 12–14 are representative of the numerous nonlinear rail configurations that are possible for the bend section of the present invention. A fundamental requirement of the rails of the present invention is to extend out of the X Y plane. Therefore, curvilinear rails 850 meet the out-of-plane requirement while providing an alternative rail design option.

Thus, significant advantages are obtained by having the rails extend out of the plane of the load beam, by having a bend section that is an open channel and orienting the open channel transversely to the load beam axis.

Although specific examples of bend sections for a head positioning suspension are described above, it will be understood that any of these bend sections may be applied in different applications in different relations to other suspension components. For example, the design of the bend section may be altered in such a way as to produce out-of-plane compliance in specific directions and amounts for a given application. Moreover, the number of rails, their width, thickness, and positioning with respect to a longitudinal axis of the bend section may be specified for any number of compliance requirements.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A head suspension comprising:
   a base;
   a load beam having a first end and a second end, a longitudinal axis extending between the first end and the second end of the load beam, and a transverse axis extending perpendicular to the longitudinal axis within a first plane; and
   a bend section extending in the first plane and connecting the base to the second end of the load beam to define a load path for transmission of forces between the base and the load beam, the bend section including a transverse axis aligned parallel to the transverse axis of the load beam, a longitudinal axis aligned parallel to the load beam longitudinal axis, a width measured along the transverse axis of the bend section between first and second sides of the bend section, and first and second rails formed from material of the bend section and extending in a direction parallel to the transverse axis of the bend section, the first and second rails being bent out of the first plane so as to form an open channel across at least a portion of the width of the bend section, the open channel being positioned in the load path such that the forces transmitted between the base and the load beam pass through the open channel in their entirety.

2. The suspension of claim 1 wherein the first and second rails extend in second and third planes distinct from the first plane.

3. The suspension of claim 1 wherein each of the first and second rails has a separate width, thickness, and length, the width of the first and second rails being substantially similar to the width of the base.

4. The suspension of claim 1 wherein the first and second rails extend in a direction substantially normal to the first plane.

5. The suspension of claim 1 wherein the first and second rails are separated in the longitudinal axis direction of the bend section, and a portion of the bend section extending in the first plane connect the first and second rails together to form the open channel.

6. The suspension of claim 1 wherein a cross-section of the open channel is substantially U-shaped.

7. The suspension of claim 1 wherein either the first rail or the second rail comprises two segments along its width.

8. The suspension of claim 1 wherein a cross-section of the open channel is substantially circular.

9. The suspension of claim 1 wherein a portion of the bend section and the first and second rails is removed on one side of the longitudinal axis.

10. The suspension of claim 1 wherein the load beam has a width centered about the longitudinal axis, and wherein the width of the first and second rails is greater than the width of the load beam and no wider than a width of the base.

11. The suspension of claim 1 wherein the load beam has a width centered about the longitudinal axis, and wherein the width the first and second rails is less than the width of the load beam.

12. A suspension member comprising:
    a plate extending in a first plane, the plate having a width centered about a longitudinal axis of the plate; and
    first and second rails formed from material of the plate and each having a width extending in a direction transverse to the longitudinal axis of the plate, the first and second rails being bent out of the first plane and being spaced apart in the longitudinal direction, the first rail having a length extending in a second plane and the second rail having a length extending in a third plane, the second and third planes being different than the first plane, wherein a portion of the plate extending in the first plane connects the first and second rails together to form an open channel having a generally U-shaped cross-section, and in combination a portion of the first and second rails extend across all of the bend section width,
    wherein the second and third planes are at an angle less than 90° from the first plane or the second and third planes are at an angle greater than 90° from the first plane.

13. The suspension member of claim 12 wherein the second and third planes are perpendicular to the first plane.

14. The suspension member of claim 12 wherein the second and third planes extend at different angles from the first plane.

15. The suspension member of claim 12 wherein the second plane and the third plane are curved.

16. A head suspension comprising:
    a base;
    a load beam; and
    a bend section including a base plate having a first end and a second end, the first end being coupled to the load beam and the second end being coupled to the base, the base plate extending in a first plane, and a rail coupled to the plate, the rail having a width, a length, and a thickness and extending in a second plane, the first plane being different from the second plane, the rail width being defined across the bend section in a direction transverse to a longitudinal axis of the head suspension, whereby the rail includes at least two segments along the rail width and the base of the load beam is coupled to the bend section between two of the rail segments.

17. A suspension member comprising:
    a base;
    a load beam; and
    stiffening means extending in a first plane and coupling the base and load beam for maximizing translational stiffness of the load beam in a direction out of the first plane while minimizing rotational stiffness of the load beam, the stiffening means including first and second rails each having a width extending in a direction transverse to a longitudinal axis of the suspension member, a length extending in a direction out of the first plane, and a thickness, the first and second rails being spaced apart along the longitudinal axis and being connected by a portion of the stiffening means that extends in the first plane so as to form a open channel; whereby the base or the load beam is attached to the stiffening means within the width of the first or second rail.

18. A head suspension comprising:
    a base;
    a load beam extending in a first plane having a first end and a second end, a longitudinal axis extending between the first end and the second end of the load beam, and a transverse axis extending perpendicular to the longitudinal axis within the first plane; and
    a bend section connecting the base to the second end of the load beam, the bend section including a transverse axis aligned parallel to the transverse axis of the load beam, and a longitudinal axis aligned parallel to the load beam longitudinal axis, a width measured along the transverse axis of the bend section, and a rail having a width extending in a direction parallel to the transverse axis of the bend section and a length extending out of the first plane, wherein the rail includes at least two separate segments along the rail width.

19. A head suspension comprising a base, a load beam, and a bend section each aligned along a longitudinal axis of the head suspension, the bend section extending in a first plane and connecting the base and the load beam to define a load path for transmission of forces between the base and the load beam, the bend section including a width extending transverse to the longitudinal axis, and first and second rails formed from material of the bend section, the first and second rails being bent out of the first plane so as to form an open channel that extends across at least a portion of the bend section width, the open channel being positioned in the load path such tat the forces transmitted between the base and the load beam pass through the open channel in their entirety, wherein the open channel and the first and second rails are arranged and configured to minimize torsional compliance of the head suspension about the longitudinal axis while minimizing changes in torsional compliance of the head suspension about a transverse axis located in the first plane and lying generally perpendicular to the longitudinal axis.

20. The head suspension of claim 19, wherein the first and second rails are connected to one another by bend section material that extends in the first plane thereby forming a generally U-shaped open channel.

21. The head suspension of claim 19, wherein at least one of the first and second rails extends across an entire width of the bend section.

22. The head suspension of claim 19, wherein the base is configured to be coupled to the bend section within a width of the first rail, and the load beam is configured to be coupled to the bend section within a width of the second rail.

23. A suspension member bend section suited for use between a suspension load beam and a suspension base member, comprising:

a plate extending in a first plane, the plate having a width centered about a longitudinal axis of the plate; and a rail formed from material of the plate and being bent out of the first plane, the rail having a width aligned substantially parallel with the plate width and having a length extending in a second plane that is different from the first plane;

whereby the plate is configured for mounting to the load beam or the suspension member within the width of the rail.

24. The suspension member of claim 23, wherein the suspension member includes first and second rails aligned substantially parallel to the plate width, each rail being formed from material of the plate and being bent out of the first plane into respective second and third planes that are different from the first plane, the first and second rails forming an open channel across at least a portion of the plate width, and the plate being configured for mounting to the load beam or the suspension member within the width of the first or second rail.

* * * * *